Oct. 15, 1946.   J. C. TROTTER   2,409,405
AIRCRAFT GUN MOUNT
Filed March 20, 1943   2 Sheets-Sheet 1
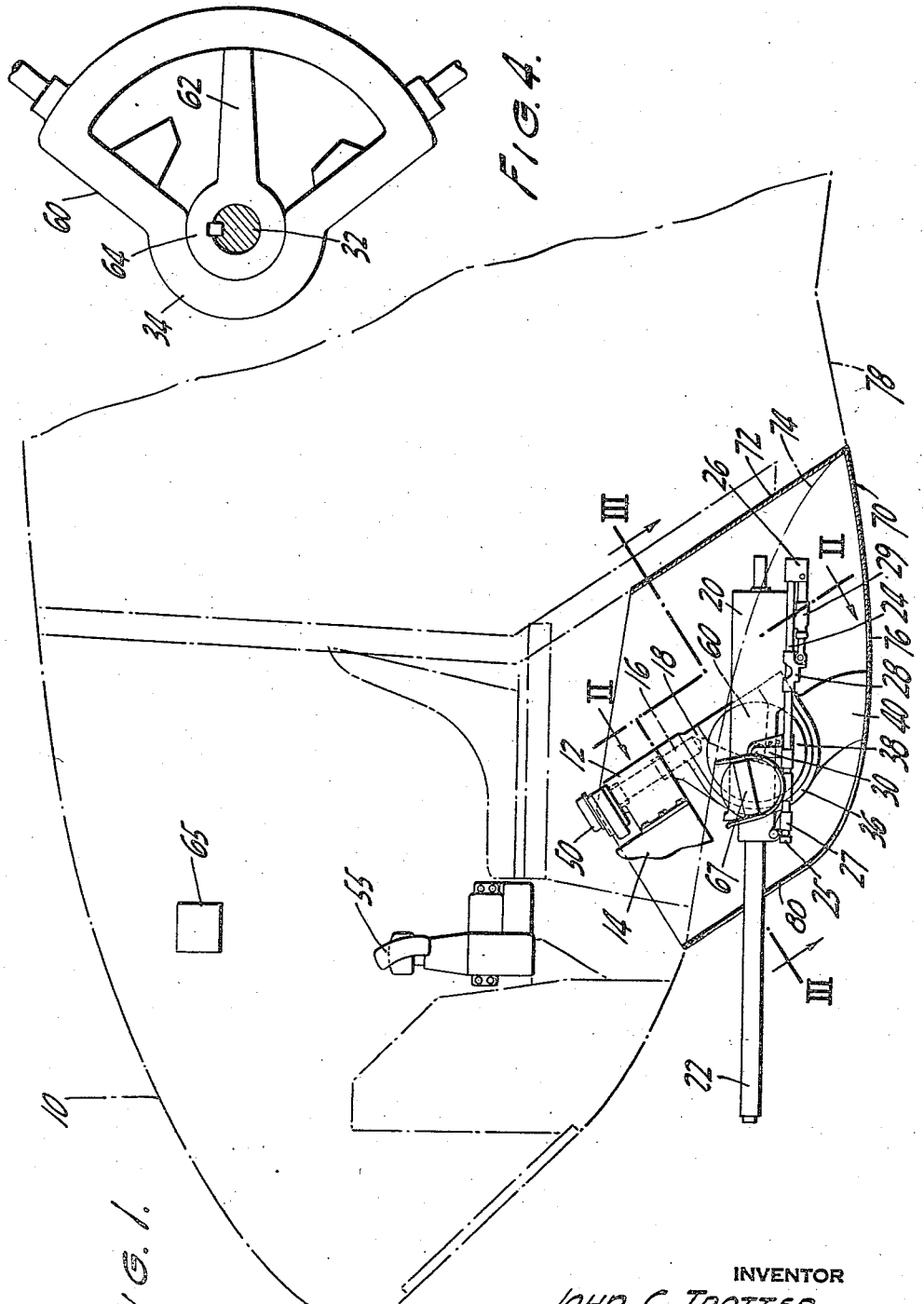
INVENTOR
JOHN C. TROTTER
BY
Bean, Brooks, Buckley & Bean
ATTORNEYS Oct. 15, 1946.  J. C. TROTTER  2,409,405
AIRCRAFT GUN MOUNT
Filed March 20, 1943  2 Sheets-Sheet 2
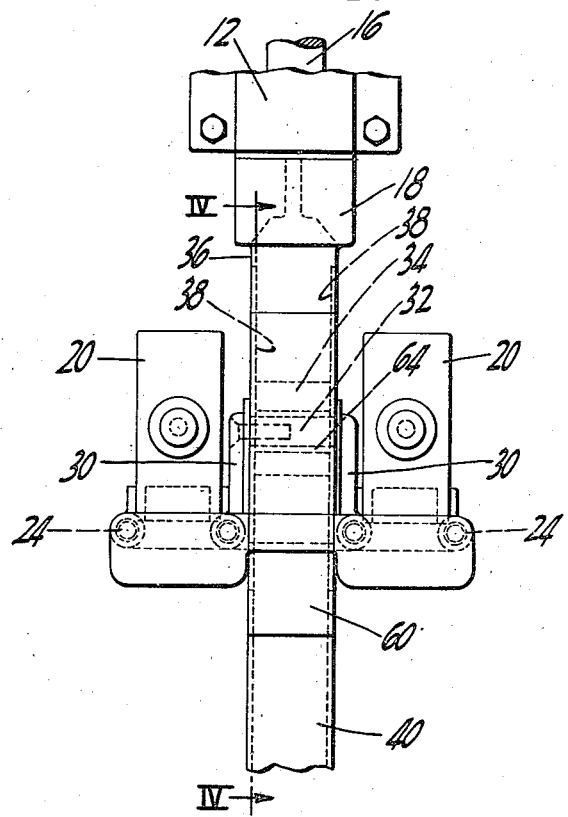
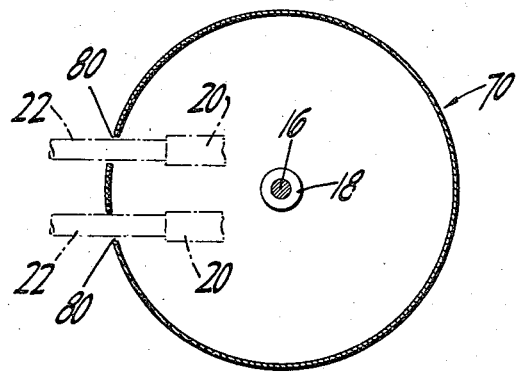
INVENTOR
JOHN C. TROTTER
BY
Bean, Brooks, Buckley & Bean
ATTORNEYS Patented Oct. 15, 1946

2,409,405

UNITED STATES PATENT OFFICE 2,409,405

AIRCRAFT GUN MOUNT

John C. Trotter, Williamsville, N. Y., assignor to Bell Aircraft Corporation, Buffalo, N. Y.

Application March 20, 1943, Serial No. 479,899

3 Claims. (Cl. 89—37.5)

This invention relates to ordnance, and more particularly to gun mount and turret enclosure arrangements adapted for use upon aircraft or the like.

One of the objects of the invention is to provide a new and improved gun mount. Another object is to provide a new and improved gun mount arrangement whereby a gun battery enclosure of new and improved form may be mounted thereon to enclose the gun battery and gun mount arrangement. Another object of the invention is to provide a gun battery turret and enclosure which is of improved form and which is adapted to rotate in improved manner in conjunction with gun battery aim adjustments. Another object of the invention is to provide an improved gun mount and turret enclosure arrangement which is particularly adapted to provide reduced air pressure forces thereagainst from externally of the turret enclosure. Another object of the invention is to provide in combination, an aircraft and a gun mount and turret enclosure protruding in improved manner beyond the basic profile of the aircraft profile, whereby the combination aircraft and gun battery enclosure offer reduced overall resistance to relative air flow. Other objects and advantages of the invention will appear from the specification hereinafter.

In the drawings:

Fig. 1 is a side elevation of a gun battery and mount of the invention arranged in conjunction with an airplane, and a gun turret enclosure of the invention shown in section;

Fig. 2 is a view taken substantially along line II—II of Fig. 1;

Fig. 3 is a section taken substantially along line III—III of Fig. 1; and

Fig. 4 is a fragmentary section taken along line IV—IV of Fig. 2.

The drawings illustrate the invention in conjunction with an aircraft fuselage portion 10 comprising a streamlined convergent end portion such as the nose or tail of a large combat airplane or the like; but it will be understood that the gun battery mount and enclosure of the invention may be employed with equal facility to provide the advantages of the invention at any other portion of an aircraft fuselage, such as in connection with gun emplacements protruding from side wall or top or bottom deck portions thereof.

The gun battery mount arrangement of the invention is characterized by support of the gun battery relative to fixed base structure so as to dispose the traverse or "azimuth" axis of gun aim adjustment to be inclined rearwardly away from the customary vertical attitude thereof. For example, as illustrated by Fig. 1, the gun battery mount mechanism may comprise a bearing block 12 rigidly supported upon a fixed structural portion 14 of the aircraft to rotatably mount a gun mount post 16 to extend below the bearing 12 for keyed engagement with a gun mount bracket 18. Hence, the post-bracket unit is, unless otherwise restrained, freely rotatable about an axis disposed vertically in front view but inclined rearwardly in side view as shown in Fig. 1 of the drawings.

A pair of machine guns or cannon, or the like, having gun casing portions 20—20 and corresponding barrels 22—22 are mounted upon the bracket 18 so as to be bodily movable therewith about the axis of the gun mount post 16, but to be freely pivotable, unless otherwise restrained, relative to the bracket 18 about elevational aim adjustment axis extending transversely through the bracket 18. For this purpose the guns are illustrated as being carried separately upon corresponding pairs of bearer rods 24; each pair of rods being cross braced at 25—26 to provide a frame upon which the corresponding gun is mounted by means of slide for reciprocation relative to the frame in directions longitudinally of the gun. A shock absorbing and counter recoil force member 29 is connected to extend between corresponding slide brackets 28 and frame braces 26 to elastically resist recoil movements of the guns and to provide the necessary counter-recoil impetus intermediately of each gun firing operation.

A stirrup 30 extends rigidly from each gun bearer frame unit to engage at its corresponding upper end with a cross bar 32 (Fig. 2) providing the elevational adjustment trunnion bearing of the gun battery. The bracket 18 is formed with a bearing block portion 34 to rotatably mount the cross bar 32 thereon. Thus, the gun battery is freely pivotable for elevational aim adjustment purposes relative to the bracket 18 about the axis of the cross bar 32, while the guns are individually reciprocable relative to each gun mount bearer frame.

The bracket 18 comprises generally a C-shaped end wall portion 36 which is concentric of the axis of elevational aim adjustment of the cross bar 32. Circular side plates 38—38 are fixed to corresponding of the stirrups 30—30 so as to extend in spaced parallel relation concentrically of the axis of the cross bar 32 to form in conjunction with the C-shaped bracket 18 a hollow frame-like casing, whereof the side plates 38—38 rotate relative to the bracket 18 in connection with elevational aim adjustments of the gun battery. The bracket 18 is so proportioned and arranged that the interior of the casing so provided is in open communication with the ports of the guns through which are ejected the ammunition belt links subsequent to segregation of the ammunition belts feeding the guns in connection with the gun firing operations. The bottom portion of the bracket 18 is formed with a downwardly extending spout 40 in open communication with the interior of the casing, whereby the ejected belt links will be received by the casing between the guns to fall therethrough in response to the forces of gravity to be discharged through the spout 40 to fall clear of the gun battery mechanisms.

Motor means for actuating the guns to provide azimuth and elevational adjustments thereof may be provided in any suitable form. As illustrated in the drawings, such aim adjustment means comprises a pair of hydraulic motors separately connected to the gun mount post 18 and to the gun frame support stirrups 30—30 respectively. A hydraulic motor of the vane piston type is illustrated at 50 as comprising a casing fixed to the bearing block 12 and containing a piston keyed to the post 16. Thus, oscillation of the motor piston in response to application of fluid pressure forces at alternate sides thereof will procure corresponding oscillations of the gun mount bracket about the axis of the post 16. It will be understood, however, that the motor 50 may comprise an electric motor, or any other suitable oscillation producing device; and that in any case the control means therefor will be arranged to be operated by manual manipulations of a control device such as the handle 55 shown in Fig. 1, in accord with any known ordnance control principles.

To procure gun aim adjustments of the gunframe unit about the axis of the cross bar 32 relative to the bracket 18, a vane piston type hydraulic motor is illustrated at 60 as being arranged interiorly of the gun mount bracket assembly. The case portion of the motor 60 is of segmental sectional form (Fig. 4); the apex portion of the motor casing being arranged to comprise the bearing block 34 supporting the cross bar 32. The piston 62 of the motor 60 is illustrated as terminating in a hub 64 at its inner end encircling the cross bar 32; whereby it will be understood that oscillation of the piston 62 within the motor case in response to application of fluid pressure forces at alternate sides thereof will procure corresponding oscillation of the cross bar and of the gun support frame attached thereto. Suitable hydraulic motor mechanisms of the type referred to are disclosed in my prior patent application Serial No. 438,400, now Patent 2,350,946, dated June 6, 1944. It will also be understood, however, that any other suitable type of motor mechanisms may be mounted in connection with the gun support frame to provide oscillation thereof about the axis of the trunnion bearing for elevational aim adjustments of the gun battery; and that in any case the motor control mechanism will be operably coupled with the manual control handle 55, whereby selective manipulation of the latter will provide the desired composition of azimuth and elevational adjustments of the gun battery. Any suitable gun sight device may be employed if desired, as indicated at 65, to enable the gunner to accurately train the gun battery upon the target; and it will be understood that any suitable means for connecting the gun sight and the gun battery control mechanism may be employed, such as is known in the ordnance art. An ammunition belt guide roll 67 is pivotally mounted upon the gun mount frame of each gun unit for smoothing the feeding of cartridge belts from positions remote from the gun battery into the ammunition feedways of the guns.

To house the gun battery against the airstream and elements exteriorly thereof a turret enclosure is provided as indicated generally at 70 to comprise a generally cylindrical casing mounted upon the airplane to rotate with the bracket 18 about the axis of the post 16. Thus, the cylindrical side wall portion 72 of the casing moves concentrically of the axis of the post 16 in conjunction with all azimuth adjustments of the gun battery aim; whereby the wall portion 72 of the turret maintains a constant relation with respect to adjacent portions of the fuselage skin which are preferably arranged to be faired into streamline relation with respect to the casing wall 72, as indicated at 74. Hence, it will be understood that the gun mount and enclosure arrangement of the invention provides a rotating turret enclosure of generally cylindrical form which may be readily merged at its rear with abutting stationary wall structure of the aircraft; while the frontal surface of the turret enclosure is of cylindrical form and slopes rearwardly and downwardly as it emerges from the fuselage so as to present a rearwardly sloping surface to the relative airstream instead of a vertical abutment thereto as in the case of a turret arranged to rotate about a substantially vertical axis. Consequently a more perfectly streamlined airplane is provided without reducing the effectiveness of the gun battery. Preferably, the ends of the turret enclosure will be truncated as illustrated in Fig. 1; and the outboard end portion thereof will be preferably closed as indicated at 76. Supplemental fairing as indicated at 78 may be arranged to extend from fixed structure of the fuselage to complete the overall streamlining of the aircraft, in any preferred manner.

It will be understood that the turret enclosure of the invention may be provided of any suitable materials, transparent or non-transparent as may be preferred; and that the frame structure thereof may be of any suitable character whereby to support the turret enclosure shell relative to a base which is in turn rotatable relative to the fuselage 10 substantially concentrically of the axis of azimuth rotation of the gun battery. The shell of the turret enclosure will be slotted as indicated at 80 to permit the guns to be adjusted in elevation relative to the enclosure.

Although only one form of the invention has been shown and described in detail, it will be apparent to those skilled in the art that the invention is not so limited but that various changes may be made therein without departing from the spirit of the invention or the scope of the appended claims.

I claim:

1. In combination, an aircraft including a streamlined body having a convergent end and a thrust axis, bearing means supported by said aircraft and inclined away from said end and outwardly with respect to said axis, a gun mount, a post rotatably journalled on said bearing means and suspending said gun mount, and an enclosure for said gun mount rotatable therewith about a common axis, said enclosure being faired into and with respect to said body.

2. In combination, an aircraft including a streamlined body having a convergent end and a longitudinal axis, bearing means supported by said aircraft and inclined away from said end and outwardly with respect to said axis, a gun mount, a post rotatably journalled on said bearing means and suspending said gun mount, and a gun mount enclosure faired into and with respect to said body having a cylindrical wall terminating in a truncated closed end wall, said enclosure being rotatable as a unit with said gun mount about a common axis.

3. In combination, a vehicle including a streamlined body having a convergence and a longitudinal axis, gun mount bearing means spaced from said axis and inclined away from said convergence and outwardly with respect to said axis, a gun mount rotatably suspended from said bearing means carried by said vehicle, and an enclosure for said mount faired into and with respect to said body having a cylindrical side wall and mounted upon said vehicle for rotation as a unit with said gun mount.

JOHN C. TROTTER.